United States Patent
Mori

(10) Patent No.: US 12,552,204 B2
(45) Date of Patent: Feb. 17, 2026

(54) PNEUMATIC TIRE

(71) Applicant: THE YOKOHAMA RUBBER CO., LTD., Kanagawa (JP)

(72) Inventor: Taiyo Mori, Kanagawa (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 0 days.

(21) Appl. No.: 18/850,401

(22) PCT Filed: Dec. 20, 2022

(86) PCT No.: PCT/JP2022/046810
§ 371 (c)(1),
(2) Date: Sep. 24, 2024

(87) PCT Pub. No.: WO2023/188604
PCT Pub. Date: Oct. 5, 2023

(65) Prior Publication Data
US 2025/0214382 A1 Jul. 3, 2025

(30) Foreign Application Priority Data
Mar. 29, 2022 (JP) .................................. 2022-053016

(51) Int. Cl.
*B60C 15/024* (2006.01)
*B60C 15/06* (2006.01)

(52) U.S. Cl.
CPC ........ *B60C 15/0607* (2013.01); *B60C 15/024* (2013.01); *B60C 15/0628* (2013.01); *B60C 2015/061* (2013.01)

(58) Field of Classification Search
CPC .................................................... B60C 15/024
See application file for complete search history.

(56) References Cited

U.S. PATENT DOCUMENTS 4,408,648 A * 10/1983 Ohashi .................. B60C 13/003
152/523
2020/0122524 A1 * 4/2020 Okabe ................. B60C 15/0635

FOREIGN PATENT DOCUMENTS

JP H05319034 A * 12/1993 ........... B60C 15/024
JP 5390392 B2 1/2014
(Continued)

OTHER PUBLICATIONS

Machine translation: JP-H05319034-A, Tsuruta Makoto, (Year: 2025).*

*Primary Examiner* — Kendra Ly
(74) *Attorney, Agent, or Firm* — Thorpe North & Western

(57) ABSTRACT

A pneumatic tire includes a circumferentially continuous recess in at least one sidewall outer surface. In a meridian cross-section, an area A of a region surrounded by outlines of the sidewall and a bead and a tangent line, an area S of a region surrounded by the outlines of the sidewall and the bead, a carcass body, a perpendicular line L2, a perpendicular line L3, and a thickness G1 of a bead filler measured along the perpendicular line L2 satisfy $0.10\times(G1-17)\leq A/(S+A)\leq 0.05\times(G1-10)$, the tangent line being straight and contacting the outlines of the sidewall and the bead, a contact point being where the tangent line and the sidewall outline contact, the perpendicular line L2 being straight and passing through a turned-up edge of a carcass and perpendicularly intersecting the carcass body, the perpendicular line L3 being straight and passing through the contact point and perpendicularly intersecting the carcass body.

20 Claims, 3 Drawing Sheets

(56) References Cited

FOREIGN PATENT DOCUMENTS

| | | |
|---|---|---|
| JP | 2014-144651 A | 8/2014 |
| JP | 2014156192 A | 8/2014 |
| WO | 2013/111576 A1 | 8/2013 |
| WO | 2013/128853 A1 | 9/2013 |

* cited by examiner

PNEUMATIC TIRE

TECHNICAL FIELD

The present technology relates to a pneumatic tire that includes a recess portion in the vicinity of a bead portion in order to reduce the tire weight.

BACKGROUND ART

In recent years, reduction in tire weight has been desired in order to increase the actual loading capacity from a viewpoint of improvement in vehicle transportation efficiency. As a method of reducing the tire weight, it has been proposed to reduce the amount of rubber in a bead portion by providing a recess portion in the vicinity of the bead portion (see, for example, Japan Patent No. 5390392 B). When such a recess portion is provided, however, the durability of the bead portion is disadvantageously reduced due to increase in distortion resulting from the reduction in the amount of rubber. In view of this, measures are required to favorably maintain the durability of the bead portion by suppressing the distortion of the bead portion (especially in the vicinity of the carcass edge), even with a pneumatic tire provided with a recess portion in the vicinity of the bead portion for the purpose of reducing the tire weight.

SUMMARY

The present technology provides a pneumatic tire that can achieve tire weight reduction while maintaining favorable bead portion durability.

A pneumatic tire of the present technology includes: a tread portion extending in a tire circumferential direction and having an annular shape: a pair of sidewall portions respectively disposed on both sides of the tread portion: a pair of bead portions each disposed on an inner side of the sidewall portions in a tire radial direction: a bead core disposed at each bead portion: a bead filler disposed on an outer side of the bead core in the tire radial direction; and at least one carcass layer disposed between the pair of bead portions, the carcass layer including a body portion turned-up from a tire inner side to a tire outer side around the bead core and the bead filler disposed at each bead portion, and located between the pair of bead portions, and a turned-up portion turned-up on an outer side of the bead core and the bead filler in a tire width direction, with a width between the pair of bead portions in a non-rim assembled state being set to a specified rim width, the pneumatic tire including a recess portion that is continuous in the tire circumferential direction in a tire outer surface on an outer side of a turned-up edge of the carcass layer of at least one of the sidewall portions in the tire radial direction and on an inner side of a tire maximum width position in the tire radial direction, the recess portion having an outline including a plurality of arcs with different curvature radii in a meridian cross-section, in the meridian cross-section, an area A (unit: mm$^2$) of a region surrounded by outer outlines of the sidewall portion and the bead portion and a tangent line L1, an area S (unit: mm$^2$) of a region surrounded by the outer outlines of the sidewall portion and the bead portion, the body portion, a perpendicular line L2, and a perpendicular line L3, and a thickness G1 (unit: mm) of the bead filler measured along the perpendicular line L2 satisfying a relationship of $0.10 \times (G1-17) \leq A/(S+A) \leq 0.05 \times (G1-10)$, the tangent line L1 being a straight line set in contact with the outer outlines of the sidewall portion and the bead portion, a contact point P1 being a point where the tangent line L1 and the outer outline of the sidewall portion are in contact with each other, the perpendicular line L2 being a straight line that passes through the turned-up edge of the carcass layer and perpendicularly intersects the body portion, the perpendicular line L3 being a straight line that passes through the contact point P1 and perpendicularly intersects the body portion.

As described above, in the present technology, the recess portion that is continuous in the tire circumferential direction is provided in the vicinity of at least one of the bead portions, and thus the tire weight can be reduced by reducing the amount of rubber in the vicinity of the bead portion. On the other hand, since the above-described recess portion is disposed on the outer side of the turned-up edge of the carcass layer in the tire radial direction and on the inner side of the tire maximum width position in the tire radial direction in the sidewall portion, and the area (area A) of the recess portion, the amount of rubber (area S) on the outer side of the carcass edge in the radial direction, and the thickness G1 of the bead filler are set to have the above-described relationship, the distortion in the vicinity of the carcass edge due to the recess portion can be dispersed, and the durability of the bead portion can be favorably ensured.

In the present technology, preferably, the outer outlines of the sidewall portion and the bead portion located between a contact point P2 and a point P3 are located on an outer side of a straight line L4 in the tire width direction, the contact point P2 being a point where the tangent line L1 and the outer outline of the bead portion are in contact with each other, the point P3 being a point separated by 10 mm from the contact point P2 on an outer side in the tire radial direction along the outer outlines of the sidewall portion and the bead portion, the straight line L4 connecting the contact point P2 and the point P3. In this manner, the shape of the recess portion (outer outline) is improved, and the amount of rubber in the vicinity of the carcass edge can be ensured, which is advantageous in improving the durability of the bead portion.

In the present technology, preferably, a ratio G2/G1 of a thickness G2 (unit: mm) of the bead filler measured on a straight line that passes through a contact point P2 and perpendicularly intersects the body portion with respect to the thickness G1 satisfies a relationship of $0.55 \leq G2/G1 \leq 0.90$, and a ratio S1/S of an area S1 (unit: mm$^2$) of a region occupied by the bead filler in the area S with respect to the area S satisfies a relationship of $0.25 \leq S1/S \leq 0.50$, the contact point P2 being a point where the tangent line L1 and the outer outline of the bead portion are in contact with each other. In this manner, the volume of the bead filler with excellent bending fatigue and rupture characteristics can be ensured, which is advantageous in improving the durability of the bead portion.

In the present technology, preferably, the bead filler has a two-layer structure including an upper bead filler and a lower bead filler, and the upper bead filler has an elongation at break of 400% or more. By using a bead filler with such a high elongation at break, the rupture in the vicinity of the carcass edge due to repetitive distortion during the rolling is suppressed, which is advantageous in improving the durability of the bead portion.

In the present technology, preferably, the upper bead filler has an elastic modulus at 60° C. of 4.0 MPa or more and 8.0 MPa or less, and the lower bead filler has an elastic modulus at 60° C. of 14.0 MPa or more and 20.0 MPa or less. In this manner, the physical properties of the upper bead filler and the lower bead filler of a case where the bead filler has a two-layer structure are improved, which is advantageous in improving the durability of the bead portion.

In the present technology, preferably, an area S2 of the upper bead filler and an area S3 of the lower bead filler satisfy a relationship of $0.30 \leq S3/S2 \leq 0.80$. The upper bead filler and the lower bead filler provided with a good balance in the above-described manner are advantageous in improving the durability of the bead portion.

In the present technology, preferably, a distance G3 between the turned-up edge and the tire outer surface measured on the perpendicular line L2 is 7.0 mm or more and 14.0 mm or less, and a distance G4 between an outer surface of the recess portion and the turned-up edge measured on an extension line of the turned-up portion is 10.0 mm or more and 40.0 mm or less. In this manner, the distance from the carcass edge to the tire outer outline can be ensured, and the distortion in the region from the carcass edge to the tire outer outline can be dispersed, which is advantageous in improving the durability of the bead portion.

In the present technology, preferably, a crack suppression rubber is disposed so as to cover the turned-up edge, and the crack suppression rubber has an elongation at break of 400% or more. By disposing the crack suppression rubber and increasing the elongation at break of the crack suppression rubber in the above-described manner, the rupture in the vicinity of the carcass edge due to repetitive distortion during the rolling can be suppressed, which is advantageous in improving the durability of the bead portion.

In the present technology, preferably, a side rubber of the sidewall portion has an elongation at break of 450% or more, and an elastic modulus at 60° C. of 2.5 MPa or more and 5.5 MPa or less. By increasing the elongation at break of the side rubber in the above-described manner, the rupture in the vicinity of the carcass edge due to repetitive distortion during the rolling can be suppressed, which is advantageous in improving the durability of the bead portion. In addition, the side rubber with such a large elastic modulus can compensate for the side rigidity reduced by providing the recess portion, which is advantageous in reducing the bead portion distortion and improving the durability.

Preferably, the present technology further includes an organic fiber reinforcing layer on an outer side of the turned-up portion of the carcass layer in the tire width direction. An end portion of the organic fiber reinforcing layer on an outer side in the tire radial direction is located on the outer side of the turned-up edge in the tire radial direction, an end portion of the organic fiber reinforcing layer on an inner side in the tire radial direction is located on the inner side of a center of the bead core in the tire radial direction, and an end portion of the organic fiber reinforcing layer on the outer side in the tire radial direction is separated from the recess portion by 6 mm or more. With the organic fiber reinforcing layer provided and arranged in the above-described manner, deformation due to deflection can be suppressed, which is advantageous in improving the durability by suppressing the distortion in the vicinity of the carcass edge.

Preferably, the present technology further includes a steel reinforcing layer disposed along outer surfaces of the body portion and the turned-up portion of the carcass layer. An end portion of the steel reinforcing layer on the turned-up portion side is disposed at a position separated by 5 mm to 25 mm from a position of the turned-up edge on an inner side in the tire radial direction, and an end portion of the steel reinforcing layer on the body portion side is disposed at a position separated by 5 mm to 25 mm from a position of the turned-up edge on an outer side in the tire radial direction. With the steel reinforcing layer provided and arranged in the above-described manner, the deformation of the bead portion due to the deflection can be suppressed by improving the side rigidity, which is advantageous in improving the durability of the bead portion.

Note that in the present technology, "specified rim width" is a width of a specified rim ("application rim" specified in JATMA (The Japan Automobile Tyre Manufacturers Association, Inc.), "Design Rim" specified in TRA (The Tire and Rim Association, Inc.), or "Measuring Rim" specified in ETRTO (the European Tyre and Rim Technical Organisation). In the present technology, the elongation at break of each portion is a value (unit: %) measured at room temperature (23° C.) in accordance with JIS (Japanese Industrial Standard) K6251. In addition, the elastic modulus at 60° C. of each portion is a value (unit: MPa) measured with a viscoelasticity spectrometer under a condition of an initial distortion of 10%, an amplitude of +2%, a frequency of 20 Hz, and a temperature of 60° C. in accordance with JIS K6394.

DETAILED DESCRIPTION

A configuration of the present technology is described in detail below with reference to the attached drawings.

Figure 1:
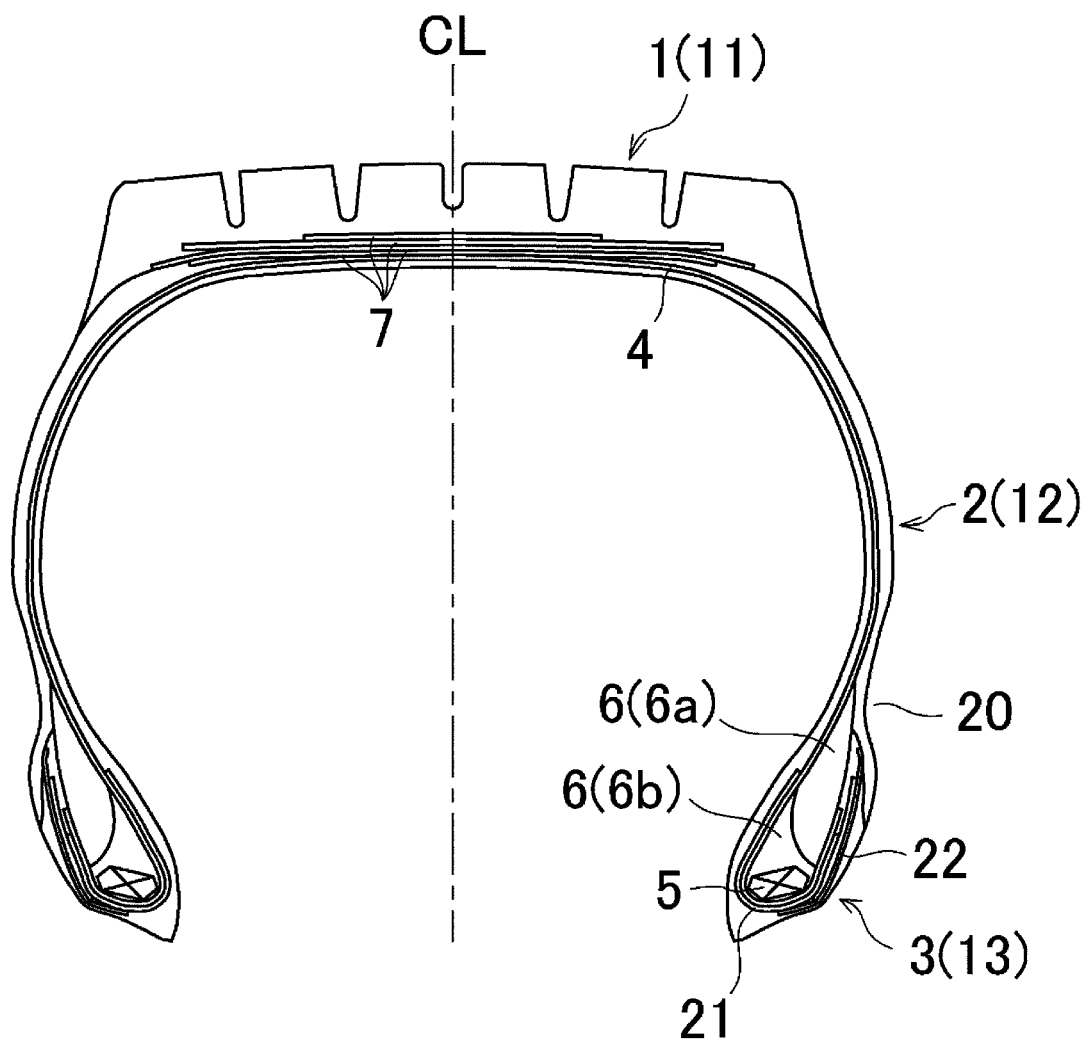
FIG. 1 is a meridian cross-sectional view illustrating an example of a pneumatic tire according to an embodiment of the present technology.

As illustrated in FIG. 1, a pneumatic tire of the present technology includes a tread portion 1, a pair of sidewall portions 2 disposed on both sides of the tread portion 1, and a pair of bead portions 3 disposed on the inner side of the sidewall portion 2 in the tire radial direction. In FIG. 1, the reference symbol CL represents a tire equator. Note that although not illustrated in FIG. 1, which is a meridian cross-sectional view, the tread portion 1, the sidewall portion 2, and the bead portion 3 each extend in the tire circumferential direction in an annular shape, thus forming a toroidal basic structure of the pneumatic tire. The following description using FIG. 1 is basically based on the meridian cross-sectional shape illustrated in the drawing, while each tire component extends in the tire circumferential direction in an annular shape. Note that the meridian cross-sectional view illustrated in the drawing represents a state where the width between the pair of bead portions 3 in a non-rim assembled state is set to a specified rim width, and the following description is based on a structure in this state.

A carcass layer 4 is disposed between the pair of left and right bead portions 3. The carcass layer 4 includes a plurality of reinforcing cords extending in the tire radial direction, and is folded back from a vehicle inner side to a vehicle outer side around a bead core 5 disposed in each bead portion 3. In addition, a bead filler 6 is disposed over the outer periphery of the bead core 5, and the bead filler 6 is sandwiched by a body portion 4a and a folded back portion 4b of the carcass layer 4.

A belt layer 7 composed of a plurality of layers (in FIG. 1, four layers) is embedded on an outer periphery side of the carcass layer 4 in the tread portion 1. Each belt layer 7 includes a plurality of reinforcing cords (steel cords) oriented in a predetermined direction. The plurality of belt layers 7 includes a crossed belt pair. The crossed belt pair is a combination of at least two belt layers configured such that the inclination angle of the reinforcing 25 cord with respect to the tire circumferential direction is set in a range of 10° to 40°, and that the reinforcing cords intersect each other with the inclination directions of the reinforcing cords opposite to each other between the layers. In addition to the crossed belt pair, it is also possible to optionally provide a large-angle belt layer in which the inclination angle of the reinforcing cord with 30 respect to the tire circumferential direction is set in a range of 40° to 70°, a protective belt layer disposed as an outermost layer with a width of 85% or less of other belt layers, a circumferential reinforcing layer in which the angle of the reinforcing cord with respect to the tire circumferential direction is set in a range of 0° to 5°, and the like. For example, in FIG. 1, one protective belt layer is disposed as the outermost layer, one large-angle belt layer is disposed as the innermost layer, and the crossed belt pair is provided as the other two layers. Further, a belt reinforcing layer (not illustrated) may be provided on the outer periphery side of the belt layer 7. The belt reinforcing layer may be composed of an organic fiber cord oriented in the tire circumferential direction, for example. In the belt reinforcing layer, the angle with respect to the tire circumferential direction in the organic fiber cord is set to 0° to 5°, for example.

In the tread portion 1, a tread rubber layer 11 is disposed on the outer periphery side of the above-described tire components (the carcass layer 4, the belt layer 7, and the belt cover layer). A side rubber layer 12 is disposed on the outer periphery side (outer side in the tire width direction) of the carcass layer 4 in the sidewall portion 2. A rim cushion rubber layer 13 is disposed on the outer periphery side (outer side in the tire width direction) of the carcass layer 4 in the bead portion 3.

In the tire of the present technology, a recess portion 20 is provided continuously in the tire circumferential direction in the outer surface of the sidewall portion 2 and the bead portion 3 of at least one side. The recess portion 20 is disposed on the outer side of the turned-up edge of the carcass layer 4 in the tire radial direction and on the inner side of a tire maximum width position P in the tire radial direction. In other words, a contact point P1 described later is located on the inner side of the tire maximum width position P in the tire radial direction, and a contact point P2 described later is located on the outer side of the turned-up edge of the carcass layer 4 in the tire radial direction. With this recess portion 20, the tire weight can be reduced by reducing the amount of rubber in the vicinity of the bead portion 3.

The outline of the recess portion 20 in the meridian cross-section is composed of a plurality of arcs with different curvature radii, and is smoothly curved. For example, the outline of the recess portion 20 can be formed by a combination of an arc protruding to the outer side in the tire width direction and an arc protruding to the inner side in the tire width direction. In particular, among the plurality of arcs making up the outline of the recess portion 20, the 30) innermost arc in the tire radial direction and the outermost arc in the tire radial direction preferably protrude to the outer side in the tire width direction.

Figure 2:
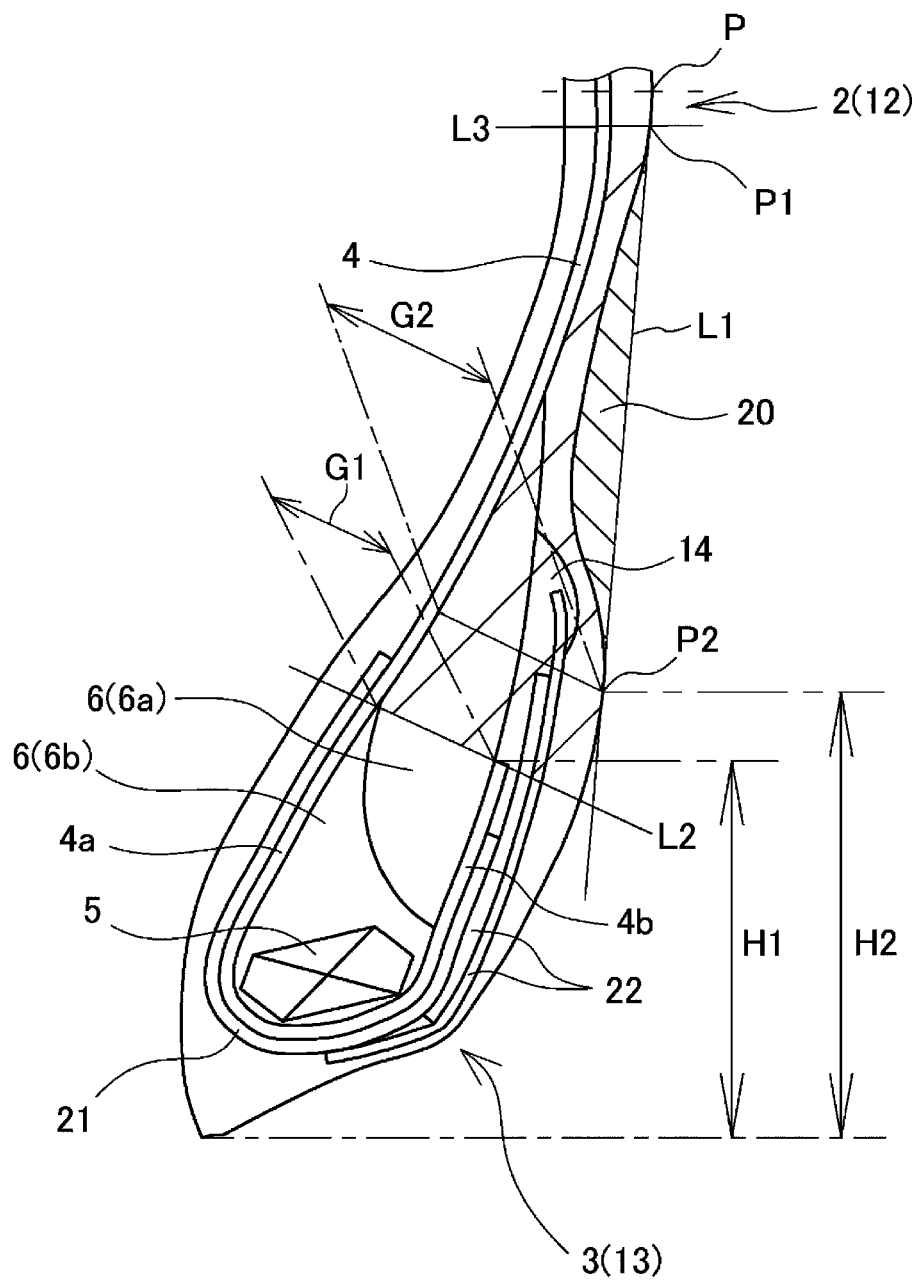
FIG. 2 is an enlarged explanatory diagram of a bead portion of the pneumatic tire according to the embodiment of the present technology.

As illustrated in FIG. 2, in the meridian cross-section, a straight line set in contact with the outer outlines of the sidewall portion 2 and the bead portion 3 is set as a tangent line L1, the point where the tangent line L1 and the outer outline of the sidewall portion 2 touch is set as the contact point P1, a straight line that passes through the turned-up edge of the carcass layer 4 and perpendicularly intersects the body portion 4a is set as a perpendicular line L2, and a straight line that passes through the contact point P1 and perpendicularly intersects the body portion 4a is set as a perpendicular line L3. In this case, an area A (unit: mm$^2$) of the region surrounded by the outer outlines of the sidewall portion 2 and the bead portion 3 and the tangent line L1 (in the drawing, the shaded area), an area S (unit: mm$^2$) of the region surrounded by the outer outlines of the sidewall portion 2 and the bead portion 3, the body portion 4a, the perpendicular line L2 and the perpendicular line L3 (in the drawing, the shaded area), and a thickness G1 (unit: mm) of the bead filler 6 measured along the perpendicular line L2 satisfy a relationship of $0.10 \times (G1-17) \leq A/(S+A) \leq 0.05 \times (G1-10)$.

With such a structure, it is possible to favorably maintain the durability of the bead portion 3, which is feared to deteriorate in the case where the recess portion 20 is provided in the vicinity of the bead portion in order to reduce the tire weight. Specifically, since the recess portion 20 is disposed on the outer side of the turned-up edge of the carcass layer 4 in the tire radial direction and on the inner side of the tire maximum width position P in the tire radial direction in the sidewall portion 2, and the area (area A) of the recess portion 20, the amount of rubber (area S) on the outer side of the carcass edge in the radial direction, and the thickness G1 of the bead filler 6 are set to have the above-described relationship, the thickness G1 of the bead filler 6 can be increased in accordance with the ratio of the area of the recess portion 20, and the durability of the bead portion 3 can be favorably ensured by dispersing the distortion in the vicinity of the carcass edge that is caused by providing the recess portion 20.

If the area A, the area S, and the thickness G1 of the bead filler 6 have a relationship of $0.10 \times (G1-17) > A/(S+A)$, the rubber for dispersing the distortion is insufficient, and the effect of improving the durability of the bead portion 3 cannot be sufficiently expected. If the area A, the area S, and the thickness G1 of the bead filler 6 have a relationship of $A/(S+A) > 0.05 \times (G1-10)$, the area of the recess portion 20 cannot be sufficiently ensured, and the effect of reducing the tire weight cannot be sufficiently expected. Preferably, the area A, the area S, and the thickness G1 of the bead filler 6 satisfy a relationship of $0.10 \times (G1-16) \leq A/(S+A) \leq 0.05 \times (G1-12)$. Note that preferably, the value of the ratio $A/(S+A)$ is, but not limited to, 0.05 to 0.25.

Figure 3:
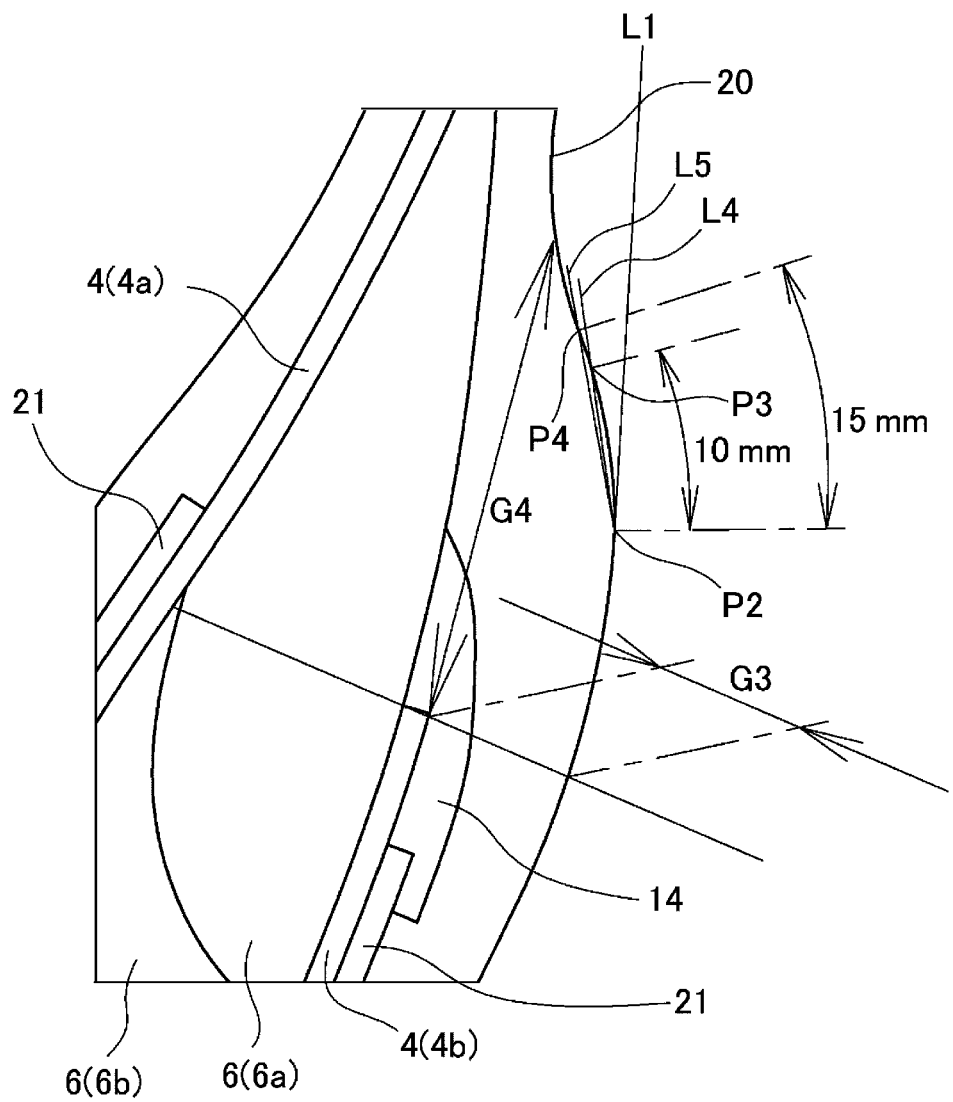
FIG. 3 is an enlarged explanatory diagram of a bead portion of a pneumatic tire according to another embodiment of the present technology.

As illustrated in FIG. 3, when the point where the tangent line L1 and the outer outline of the bead portion 3 are in contact with each other is set as the contact point P2, the outer outlines of the sidewall portion 2 and the bead portion 3 located between the contact point P2 and a point P3 is preferably located on the outer side in the tire width direction than a straight line L4 connecting the contact point P2 and the point P3. The point P3 is a point that is separated by 10 mm from the contact point P2 on the outer side in the tire radial direction along the outer outlines of the sidewall portion 2 and the bead portion 3. In this manner, the outer outline between the point P3 and the contact point P2 protrudes to the outer side in the tire width direction, and the shape (outer outline) of the recess portion 20 is improved, and thus, the amount of rubber in the vicinity of the carcass edge can be ensured, which is advantageous in improving the durability of the bead portion 3.

Further, as illustrated in FIG. 3, the outer outlines of the sidewall portion 2 and the bead portion 3 located between the contact point P2 and a point P4 is preferably located on the outer side in the tire width direction than a straight line L5 connecting the contact point P2 and the point P4. The point P4 is a point that is separated by 15 mm from the contact point P2 on the outer side in the tire radial direction along the outer outlines of the sidewall portion 2 and the bead portion 3. In this manner, the outer outline between the point P4 and the contact point P2 also protrudes to the outer side in the tire width direction, and the shape (outer outline) of the recess portion 20 is improved, and thus, the amount of rubber in the vicinity of the carcass edge can be ensured, which is advantageous in improving the durability of the bead portion 3.

As illustrated in FIG. 2, when the point where the tangent line L1 and the outer outline of the bead portion 3 are in contact with each other is set as the contact point P2, and the thickness of the bead filler 6 measured on a straight line that passes through the contact point P2 and perpendicularly intersects the body portion 4a is set as G2 (unit: mm), the ratio G2/G1 of the thickness G2 to the thickness G1 preferably satisfies a relationship of 0.55≤G2/G1≤0.90, more preferably satisfies a relationship of 0.60≤G2/G1≤0.85. In this manner, the volume of the bead filler 6 with excellent bending fatigue and rupture characteristics can be ensured, which is advantageous in improving the durability of the bead portion 3. If G2/G1 is smaller than 0.55, the amount of rubber is insufficient and the distortion in the vicinity of the carcass edge cannot be sufficiently suppressed, and, the effect of improving the durability cannot be sufficiently expected. If G2/G1 is greater than 0.90, the amount of rubber in the side portion is insufficient, and failures such as ozone cracks may easily occur.

When the region occupied by the bead filler 6 in the above-described area S is set as an area S1 (unit: mm²), the ratio S1/S of the area S1 to the area S preferably satisfies a relationship of 0.25≤S1/S≤0.50, more preferably satisfies a relationship of 0.30≤S1/S≤0.45. In this manner, the volume of the bead filler 6 with excellent bending fatigue and rupture characteristics can be ensured, which is advantageous in improving the durability of the bead portion 3. If S1/S is smaller than 0.25, the amount of rubber is insufficient and the distortion in the vicinity of the carcass edge cannot be sufficiently suppressed, and, the effect of improving the durability cannot be sufficiently expected. If S1/S is greater than 0.50, the amount of rubber in the side portion is insufficient, and failures such as ozone cracks may easily occur.

As illustrated in FIG. 2, when the distance along the tire radial direction from the innermost point (end of bead toe) of the bead portion 3 in the tire radial direction to the carcass edge is set as H1, and the distance along the tire radial direction from the innermost point (end of bead toe) of the bead portion 3 in the tire radial direction to the contact point P is set as H2, the ratio H2/H1 is preferably 1.1 or more and 1.5 or less. In this manner, the shape of each portion in the bead portion 3 is further improved, which is advantageous in improving the durability of the bead portion 3.

In the present technology, preferably, the bead filler 6 has a two-layer structure composed of an upper bead filler 6a and a lower bead filler 6b. In the case where the bead filler 6 with such a two-layer structure is used, the elongation at break of the upper bead filler 6a is preferably 400% or more, more preferably 450% or more. By using the bead filler 6 with a such high elongation at break, the rupture in the vicinity of the carcass edge due to repetitive distortion during the rolling is suppressed, which is advantageous in improving the durability of the bead portion. If the elongation at break of the upper bead filler 6a is smaller than 400%, the rubber around the carcass is easily ruptured due to repetitive distortion, which makes it difficult to sufficiently improve durability of the bead portion 3. Note that preferably, the upper limit of the elongation at break of the upper bead filler 6a is, but not limited to, 800% or less, for example. In addition, preferably, the range of the elongation at break of the lower bead filler 6b is, but not limited to, 50% to 250%, for example.

In the case where the bead filler 6 with a two-layer structure is used in the above-described manner, the elastic modulus at 60° C. of the upper bead filler 6a is preferably 4.0 MPa or more and 8.0 MPa or less, more preferably 4.5 MPa to 7.5 MPa. In addition, the elastic modulus at 60° C. of the lower bead filler 6b is preferably 14.0 MPa or more and 20.0 MPa or less, more preferably 15.0 MPa or more and 19.0 MPa or less. In this manner, the physical properties of the upper bead filler 6a and the lower bead filler 6b of a case where the bead filler 6 has a two-layer structure are improved, which is advantageous in improving the durability of the bead portion. If the elastic modulus at 60° C. of the upper bead filler 6a and the lower bead filler 6b is lower than the above-described range, the deformation of the bead portion 3 under load is large and the distortion of the carcass edge is also large, and consequently, the effect of improving the durability cannot be sufficiently expected. If the elastic modulus at 60° C. of the upper bead filler 6a and the lower bead filler 6b is higher than the above-described range, the elongation at break of the bead filler 6 cannot be improved, and consequently the effect of improving the durability cannot be sufficiently expected.

In the case where the bead filler 6 with a two-layer structure is used in the above-described manner, the area S2 of the upper bead filler 6a and the area S3 of the lower bead filler 6b preferably satisfy a relationship of 0.30≤S3/S2≤0.80, more preferably a relationship of 0.40≤S3/S2≤0.70. The upper bead filler 6a and the lower bead filler 6b provided with a good balance in this manner are advantageous in improving the durability of the bead portion 3. Specifically, in the case where the elongation at break of the upper bead filler 6a is large, the area of the upper bead filler 6a is large, and the distortion in the vicinity of the carcass edge can be dispersed, thus improving the durability of the bead portion 3. On the other hand, in the case where the elastic modulus of lower bead filler 6b is high, the deformation of the entirety of the bead portion 3 under load is suppressed, thus improving the durability of the bead portion 3. With the areas set as described above, the balance of the areas of the upper bead filler 6a and lower bead filler 6b is favorable, and the above-described effect can be effectively achieved, and thus, the durability of the bead portion 3 can be increased overall.

As illustrated in FIG. 3, when the distance between the turned-up edge and the tire outer surface measured on the perpendicular line L2 is set as G3, and the distance between the turned-up edge and the outer surface of the recess portion 20 measured on the extension line of the turned-up portion 4b is set as G4, the distance G3 is preferably 7.0 mm or more and 14.0 mm or less, more preferably 8.0 mm or more and 13.0 mm or less, and the distance G4 is preferably 10.0 mm or more and 40.0 mm or less, more preferably 15.0 mm or more and 37.0 mm or less. In this manner, the distance from the carcass edge to the tire outer outline can be sufficiently ensured, and the distortion in the region from the carcass edge to the tire outer outline can be dispersed, which is advantageous in improving the durability of the bead portion 3. If the distances G3 and G4 are smaller than the above-described range, the amount of rubber cannot be sufficiently ensured, and the distortion of the carcass edge cannot be sufficiently dispersed, and consequently, the effect of improving the durability cannot be sufficiently expected. If the distances G3 and G4 are greater than the above-described range, the effect of reducing the tire weight cannot be sufficiently expected.

In the present technology, the elongation at break of the rubber of the side rubber layer 12 is preferably 450% or more, more preferably 500% or more. In addition, the elastic modulus at 60° C. of the rubber of the side rubber layer 12 is preferably 2.5 MPa or more and 5.5 MPa or less, more preferably 3.5 MPa or more and 5.0 MPa or less. By increasing the elongation at break of the side rubber in the above-described manner, the rupture in the vicinity of the carcass edge due to repetitive distortion during the rolling can be suppressed, which is advantageous in improving the durability of the bead portion. In addition, the side rubber with such a large elastic modulus can compensate for the side rigidity reduced by providing the recess portion, which is advantageous in reducing the bead portion distortion and improving the durability. If the elongation at break of the rubber of the side rubber layer 12 is smaller than 450%, the rubber around the carcass is easily ruptured due to repetitive distortion during the rolling, which makes it difficult to sufficiently improve durability of the bead portion 3. Note that preferably, the upper limit of the elongation at break of the side rubber layer 12 is, but not limited to, 800% or less, for example. If the elastic modulus at 60° C. of the rubber of the side rubber layer 12 is smaller than 2.5 MPa, the side rigidity cannot be sufficiently ensured, while if it is greater than 5.5 MPa, the elongation at break of the side rubber layer 12 cannot be favorably maintained, and consequently, the effect of improving the durability cannot be sufficiently expected.

In the present technology, as illustrated in FIG. 3, a crack suppression rubber layer 14 may be disposed so as to cover the turned-up edge of the carcass layer 4. It is preferable to dispose the crack suppression rubber layer 14 in contact with both the side rubber layer 12 and the rim cushion rubber layer 13. In addition, in the case where a steel reinforcing layer 21 described later is provided, it is preferable to dispose it so as to cover not only the turned-up edge of the carcass layer 4 but also the end portion of the steel reinforcing layer 21. Likewise, in the case where an organic fiber reinforcing layer 22 described later is provided, it is preferable to be disposed so as to cover not only the turned-up edge of the carcass layer 4 but also the end portion of the organic fiber reinforcing layer 22. In the case where such a crack suppression rubber layer 14 is provided, it is preferable to set its elongation at break to 400% or more, more preferably to 450 or more. With the crack suppression rubber layer 14 with such a high elongation at break, the rupture in the vicinity of the carcass edge due to repetitive distortion during the rolling can be suppressed, which is advantageous in improving the durability of the bead portion. If the elongation at break of the crack suppression rubber layer 14 is smaller than 400%, the rubber around the carcass is easily ruptured due to repetitive distortion during the rolling, which makes it difficult to sufficiently improve durability of the bead portion 3. Note that it is preferable to set the upper limit of the elongation at break of the crack suppression rubber layer 14 to, but not limited to, 800% or less, for example.

In the present technology, as illustrated in FIG. 2, the steel reinforcing layer 21 can be disposed along the outer surface of the body portion 4a and the turned-up portion 4b of the carcass layer 4. In the case where the steel reinforcing layer 21 is provided, its end portion on the turned-up portion 4b side is preferably separated from the position of the turned-up edge to the inner side in the tire radial direction, and the separation distance along the tire radial direction between the turned-up edge and the end portion of the steel reinforcing layer 21 on the turned-up portion 4b side is preferably 5 mm to 25 mm, more preferably 7 mm to 20 mm. In addition, the end portion on the body portion 4a side is preferably separated from the position of the turned-up edge to the outer side in the tire radial direction, and the separation distance along the tire radial direction between the turned-up edge and the end portion of the steel reinforcing layer 21 on the body portion 4a side is preferably 5 mm to 25 mm, more preferably 7 mm to 20 mm. With the steel reinforcing layer 21 provided and arranged as described above, the deformation of the bead portion due to the deflection can be suppressed by improving the side rigidity, which is advantageous in improving the durability of the bead portion.

In the present technology, as illustrated in FIG. 2, the organic fiber reinforcing layer 22 may be disposed on the outer side of the turned-up portion 4b of the carcass layer 4 in the tire width direction. Note that in the case where the above-described steel reinforcing layer 21 is provided, it is preferable to provide the organic fiber reinforcing layer 22 on the outer periphery side (outer side in the tire width direction) of the steel reinforcing layer 21 as illustrated in the drawing. In the case where the organic fiber reinforcing layer 22 is provided, preferably, its end portion on the outer side in the tire radial direction is located on the outer side of the turned-up edge in the tire radial direction, and its end portion on the inner side in the tire radial direction is located on the inner side of the center of the bead core 5 in the tire radial direction. In addition, the end portion of the organic fiber reinforcing layer 22 on the outer side in the tire radial direction is separated from the recess portion by 6 mm or more. With the organic fiber reinforcing layer 22 provided and arranged as described above, deformation due to deflection can be suppressed, which is advantageous in improving durability by suppressing the distortion in the vicinity of the carcass edge.

The present technology is further described below with Examples, but the scope of the present technology is not limited by the following Examples.

Examples

Thirty-five types of pneumatic tires of Conventional Example 1, Comparative Example 1, and Examples 1 to 33 were produced with a tire size of 11R22.5, the basic structure illustrated in FIG. 1, and the structures in the vicinity of the bead portion set as in Tables 1 to 3.

Regarding "Presence/absence of recess portion" in Tables 1 to 4, a case where a recess portion that is continuous in the tire circumferential direction is provided in the tire outer surface on the outer side of the turned-up edge of the carcass layer of the sidewall portion in the tire radial direction and on the inner side of the tire maximum width position in the tire radial direction as illustrated in FIG. 1 is indicated as "Present", and a case where such a recess portion is not present is indicated as "Absent". Note that a case where the recess portion is provided in only one sidewall portion is indicated as "Present (one side)" (in the case where the recess portion is provided in only one sidewall portion, other items are numerical values and the like of the side where the recess portion is provided).

"G1" in Tables 1 to 4 is the thickness G1 (unit: mm) of the bead filler measured along a straight line (the perpendicular line L2) that passes through the turned-up edge of the carcass layer and perpendicularly intersects carcass layer body portion. "A/(S+A)" in Tables 1 to 4 is the area ratio calculated from the area A (unit: mm$^2$) of the region surrounded by the outer outlines of the sidewall portion and the bead portion and the tangent line L1 (a straight line set in contact with the outer outlines of the sidewall portion and the bead portion), and the area S (unit: mm$^2$) of the region surrounded by the outer outlines of the sidewall portion and the bead portion, the body portion, and the above-described perpendicular line L2 and perpendicular line L3 (a straight line that passes through the point (the contact point P1) where the above-described tangent line L1 and the outer outline of the sidewall portion are in contact with each other and perpendicularly intersects the carcass layer body portion).

The row "Outer outline shape with respect to straight line L4" in Tables 1 to 4 indicates a curved shape of the outer outline with respect to the straight line L4 (the protruding direction with respect to the straight line L4). The straight line L4 is a line that is set to connect the contact point P2 and the point P3 when the contact point P2 is set as a point where the above-described tangent line L1 and the outer outline of the bead portion are in contact with each other, and the point P3 is set as a point that is separated by 10 mm from the contact point P2 on the outer side in the tire radial direction along the outer outlines of the sidewall portion and the bead portion. The case where the outer outlines of the sidewall portion and the bead portion located between the contact point P2 and the point P3 are located on the outer side of the straight line L4 in the tire width direction is indicated as "Outside", and the other cases are indicated as "Inside".

"S1/S" in Tables 1 to 4 is the ratio of the area S1 (unit: mm$^2$), which is the region occupied by the bead filler in the above-described area S, to the area S. "G2/G1" in Tables 1 to 4 is the ratio of the thicknesses G1 and G2 of the bead filler measured at different positions. G1 is a thickness of the bead filler measured along a straight line (the perpendicular line L2) that passes through the turned-up edge of the carcass layer and perpendicularly intersects carcass layer body portion, and G2 is a thickness of the bead filler measured on a straight line that passes through the above-described contact point P2 and perpendicularly intersects the body portion of the carcass layer.

"Elongation at break (upper side BF)" in Tables 1 to 4 is an elongation at break of the upper bead filler in the bead filler with the two-layer structure. "Elongation at break (side)" in Tables 1 to 4 is an elongation at break of the side rubber of the sidewall portion. They are values (unit: %) measured at room temperature (23° C.) in accordance with JIS K6251 for the rubber of each portion.

"Elastic modulus (upper side BF)" in Tables 1 to 4 is an elastic modulus at 60° C. of the upper bead filler in the bead filler with the two-layer structure, and "Elastic modulus (lower side BF)" is an elastic modulus at 60° C. of the lower bead filler in the bead filler with the two-layer structure. "Elastic modulus (side)" is an elastic modulus at 60° C. of the side rubber of the sidewall portion. "Elastic modulus (cr)" is an elastic modulus at 60° C. of the rubber of the crack suppression rubber layer. They are values (unit: MPa) measured for the rubber of each portion by using a viscoelasticity spectrometer under a condition of an initial distortion of 10%, an amplitude of =2%, a frequency of 20 Hz, and a temperature of 60° C. in accordance with JIS K6394.

"S3/S2" in Tables 1 to 4 is a ratio of the area S2 of the upper bead filler and the area S3 of the lower bead filler. "G3" in Tables 1 to 4 is a distance between the turned-up edge and the tire outer surface measured on the above-described perpendicular line L2. "G4" in Tables 1 to 4 is a distance between the turned-up edge and the outer surface of the recess portion measured on the extension line of the turned-up portion.

In the row of "Presence/absence of organic fiber reinforcing layer" in Tables 1 to 4, "Present" indicates a case where the organic fiber reinforcing layer is provided on the outer side of the turned-up portion of the carcass layer in the tire width direction, and "Absent" indicates a case where such an organic fiber reinforcing layer is not provided. In the case where the organic fiber reinforcing layer is provided, the end portion of the organic fiber reinforcing layer on the outer side in the tire radial direction is located on the outer side of the turned-up edge in the tire radial direction, the end portion of the organic fiber reinforcing layer on the inner side in the tire radial direction is located on the inner side of the center of the bead core in the tire radial direction, and the end portion of the organic fiber reinforcing layer on the outer side in the tire radial direction is separated from the recess portion by 6 mm or more.

In the row of "Presence/absence of steel reinforcing layer" in Tables 1 to 4, "Present" indicates a case where the steel reinforcing layer is disposed along the outer surfaces of the turned-up portion and the body portion of the carcass layer, and "Absent" indicates a case where such a steel reinforcing layer is not disposed. In the case where the steel reinforcing layer is provided, the end portion of the steel reinforcing layer on the turned-up portion side is disposed at a position separated by 5 mm to 25 mm from the position of the turned-up edge on the inner side in the tire radial direction, and the end portion of the steel reinforcing layer on the body portion side is disposed at a position separated by 5 mm to 25 mm from the position of the turned-up edge on the outer side in the tire radial direction.

The tire weight reduction amount and the durability of the above-described test tires were evaluated by evaluation methods described below, and Tables 1 to 4 show the results.

Tire Weight Reduction Amount

The weight (kg) of each test tire was measured, and the reduction amount relative to Conventional Example 1 provided with no recess portion (the absolute value of the difference from the tire weight of Conventional Example 1) was calculated. The evaluation results are expressed as real number values of the calculated reduction amount (kg). The greater the value, the higher the effect of reducing the tire weight.

Durability

With each test tire assembled on a rim specified in JATMA, mounted to a drum testing instrument with a drum diameter of 1707 mm, filled with a maximum air pressure specified in JATMA, and applied with a maximum load specified in JATMA, the distance where bulging or separation of the bead portion was detected was measured after running under a condition of a running speed of 45 km/h. The evaluation results are expressed as indices with Conventional Example 1 as 100. The greater the index value, the longer the travel distance before bulging or separation of the bead portion is detected, i.e., the more durable the bead portion. Note that the index value of "90" or more means that sufficient durability was obtained in comparison with Conventional Example 1 provided with no recess portion.

TABLE 1

| | Conventional Example 1 | Comparative Example 1 | Example 1 |
|---|---|---|---|
| Presence/absence of recess portion | Absent | Present | Present |
| G1 mm | 12 | 12 | 12 |
| 0.10 × (G1 − 17) | −0.5 | −0.5 | −0.5 |
| 0.05 × (G1 − 10) | 0.1 | 0.1 | 0.1 |
| A/(S + A) | — | 0.2 | 0.1 |
| Outer outline shape with respect to straight line L4 | — | Inside | Inside |
| S1/S | 0.2 | 0.2 | 0.2 |
| G2/G1 | 0.4 | 0.4 | 0.4 |
| Elongation at break (upper side BF) % | 350 | 350 | 350 |
| Elastic modulus (upper side BF) MPa | 3.5 | 3.5 | 3.5 |
| Elastic modulus (lower side BF) MPa | 13.0 | 13.0 | 13.0 |
| S3/S2 | 0.250 | 0.250 | 0.250 |
| G3 | 5.5 | 5.5 | 5.5 |
| G4 mm | — | 8.0 | 8.0 |
| Elongation at break (side) % | 400 | 400 | 400 |
| Elastic modulus (side) MPa | 2.0 | 2.0 | 2.0 |
| Elastic modulus (cr) % | 350 | 350 | 350 |
| Presence/absence of organic fiber reinforcing layer | Absent | Absent | Absent |
| Presence/absence of steel reinforcing layer | Absent | Absent | Absent |
| Tire Weight Reduction Amount kg | 0 | 2 | 1 |
| Durability Index | 100 | 80 | 90 |

| | Example 2 | Example 3 | Example 4 | Example 5 |
|---|---|---|---|---|
| Presence/absence of recess portion | Present (one side) | Present | Present | Present |
| G1 mm | 12 | 14 | 16 | 17 |
| 0.10 × (G1 − 17) | −0.5 | −0.3 | −0.1 | 0.0 |
| 0.05 × (G1 − 10) | 0.1 | 0.2 | 0.3 | 0.4 |
| A/(S + A) | 0.1 | 0.2 | 0.2 | 0.3 |
| Outer outline shape with respect to straight line L4 | Inside | Inside | Inside | Inside |
| S1/S | 0.2 | 0.2 | 0.2 | 0.2 |
| G2/G1 | 0.4 | 0.4 | 0.4 | 0.4 |
| Elongation at break (upper side BF) % | 350 | 350 | 350 | 350 |
| Elastic modulus (upper side BF) MPa | 3.5 | 3.5 | 3.5 | 3.5 |
| Elastic modulus (lower side BF) MPa | 13.0 | 13.0 | 13.0 | 13.0 |
| S3/S2 | 0.250 | 0.250 | 0.250 | 0.250 |
| G3 mm | 5.5 | 5.5 | 5.5 | 5.5 |
| G4 mm | 8.0 | 8.0 | 8.0 | 8.0 |
| Elongation at break (side) % | 400 | 400 | 400 | 400 |
| Elastic modulus (side) MPa | 2.0 | 2.0 | 2.0 | 2.0 |
| Elastic modulus (cr) % | 350 | 350 | 350 | 350 |
| Presence/absence of organic fiber reinforcing layer | Absent | Absent | Absent | Absent |
| Presence/absence of steel reinforcing layer | Absent | Absent | Absent | Absent |
| Tire Weight Reduction Amount kg | 0.5 | 1.5 | 1.2 | 2 |
| Durability Index | 90 | 95 | 100 | 98 |

| | Example 6 | Example 7 | Example 8 | Example 9 |
|---|---|---|---|---|
| Presence/absence of recess portion | Present | Present | Present | Present |
| G1 mm | 16 | 16 | 16 | 16 |
| 0.10 × (G1 − 17) | −0.1 | −0.1 | −0.1 | −0.1 |
| 0.05 × (G1 − 10) | 0.3 | 0.3 | 0.3 | 0.3 |
| A/(S + A) | 0.2 | 0.2 | 0.2 | 0.2 |
| Outer outline shape with respect to straight line L4 | Outside | Outside | Outside | Outside |
| S1/S | 0.2 | 0.25 | 0.4 | 0.5 |
| G2/G1 | 0.4 | 0.7 | 0.7 | 0.7 |
| Elongation at break (upper side BF) % | 350 | 350 | 350 | 350 |
| Elastic modulus (upper side BF) MPa | 3.5 | 3.5 | 3.5 | 3.5 |
| Elastic modulus (lower side BF) MPa | 13.0 | 13.0 | 13.0 | 13.0 |
| S3/S2 | 0.250 | 0.250 | 0.250 | 0.250 |
| G3 mm | 5.5 | 5.5 | 5.5 | 5.5 |
| G4 mm | 8.0 | 8.0 | 8.0 | 8.0 |

TABLE 1-continued

| | | | | |
|---|---|---|---|---|
| Elongation at break (side) % | 400 | 400 | 400 | 400 |
| Elastic modulus (side) MPa | 2.0 | 2.0 | 2.0 | 2.0 |
| Elastic modulus (cr) % | 350 | 350 | 350 | 350 |
| Presence/absence of organic fiber reinforcing layer | Absent | Absent | Absent | Absent |
| Presence/absence of steel reinforcing layer | Absent | Absent | Absent | Absent |
| Tire Weight Reduction Amount kg | 1.2 | 1.2 | 1.2 | 1.2 |
| Durability Index | 104 | 105 | 107 | 106 |

TABLE 2-1

| | Example 10 | Example 11 | Example 12 | Example 13 |
|---|---|---|---|---|
| Presence/absence of recess portion | Absent | Present | Present | Present |
| G1 mm | 16 | 16 | 16 | 16 |
| 0.10 × (G1 − 17) | −0.1 | −0.1 | −0.1 | −0.1 |
| 0.05 × (G1 − 10) | 0.3 | 0.3 | 0.3 | 0.3 |
| A/(S + A) | 0.2 | 0.2 | 0.2 | 0.2 |
| Outer outline shape with respect to straight line L4 | Outside | Outside | Outside | Outside |
| S1/S | 0.4 | 0.4 | 0.4 | 0.4 |
| G2/G1 | 0.55 | 0.9 | 0.7 | 0.7 |
| Elongation at break (upper side BF) % | 350 | 350 | 500 | 500 |
| Elastic modulus (upper side BF) MPa | 3.5 | 3.5 | 3.5 | 4.0 |
| Elastic modulus (lower side BF) MPa | 13.0 | 13.0 | 13.0 | 14.0 |
| S3/S2 | 0.250 | 0.250 | 0.250 | 0.250 |
| G3 mm | 5.5 | 5.5 | 5.5 | 5.5 |
| G4 mm | 8.0 | 8.0 | 8.0 | 8.0 |
| Elongation at break (side) % | 400 | 400 | 400 | 400 |
| Elastic modulus (side) MPa | 2.0 | 2.0 | 2.0 | 2.0 |
| Elastic modulus (cr) % | 350 | 350 | 350 | 350 |
| Presence/absence of organic fiber reinforcing layer | Absent | Absent | Absent | Absent |
| Presence/absence of steel reinforcing layer | Absent | Absent | Absent | Absent |
| Tire Weight Reduction Amount kg | 1.2 | 1.2 | 1.2 | 1.2 |
| Durability Index | 105 | 106 | 109 | 111 |

| | Example 14 | Example 15 | Example 16 | Example 17 |
|---|---|---|---|---|
| Presence/absence of recess portion | Present | Present | Present | Present |
| G1 mm | 16 | 16 | 16 | 16 |
| 0.10 × (G1 − 17) | −0.1 | −0.1 | −0.1 | −0.1 |
| 0.05 × (G1 − 10) | 0.3 | 0.3 | 0.3 | 0.3 |
| A/(S + A) | 0.2 | 0.2 | 0.2 | 0.2 |
| Outer outline shape with respect to straight line L4 | Outside | Outside | Outside | Outside |
| S1/S | 0.4 | 0.4 | 0.4 | 0.4 |
| G2/G1 | 0.7 | 0.7 | 0.7 | 0.7 |
| Elongation at break (upper side BF) % | 500 | 500 | 500 | 500 |
| Elastic modulus (upper side BF) MPa | 5.5 | 8.0 | 5.5 | 5.5 |
| Elastic modulus (lower side BF) MPa | 14.0 | 14.0 | 17.0 | 20.0 |
| S3/S2 | 0.250 | 0.250 | 0.250 | 0.250 |
| G3 mm | 5.5 | 5.5 | 5.5 | 5.5 |
| G4 mm | 8.0 | 8.0 | 8.0 | 8.0 |
| Elongation at break (side) % | 400 | 400 | 400 | 400 |
| Elastic modulus (side) MPa | 2.0 | 2.0 | 2.0 | 2.0 |
| Elastic modulus (cr) % | 350 | 350 | 350 | 350 |
| Presence/absence of organic fiber reinforcing layer | Absent | Absent | Absent | Absent |
| Presence/absence of steel reinforcing layer | Absent | Absent | Absent | Absent |
| Tire Weight Reduction Amount kg | 1.2 | 1.2 | 1.2 | 1.2 |
| Durability Index | 112 | 111 | 114 | 113 |

TABLE 3

| | Example 18 | Example 19 | Example 20 | Example 21 | Example 22 |
|---|---|---|---|---|---|
| Presence/absence of recess portion | Present | Present | Present | Present | Present |
| G1 mm | 16 | 16 | 16 | 16 | 16 |
| 0.10 × (G1 − 17) | −0.1 | −0.1 | −0.1 | −0.1 | −0.1 |
| 0.05 × (G1 − 10) | 0.3 | 0.3 | 0.3 | 0.3 | 0.3 |
| A/(S + A) | 0.2 | 0.2 | 0.2 | 0.2 | 0.2 |
| Outer outline shape with respect to straight line L4 | Outside | Outside | Outside | Outside | Outside |
| S1/S | 0.4 | 0.4 | 0.4 | 0.4 | 0.4 |
| G2/G1 | 0.7 | 0.7 | 0.7 | 0.7 | 0.7 |
| Elongation at break (upper side BF) % | 500 | 500 | 500 | 500 | 500 |
| Elastic modulus (upper side BF) MPa | 5.5 | 5.5 | 5.5 | 5.5 | 5.5 |
| Elastic modulus (lower side BF) MPa | 17.0 | 17.0 | 17.0 | 17.0 | 17.0 |
| S3/S2 | 0.30 | 0.50 | 0.80 | 0.50 | 0.50 |
| G3 mm | 5.5 | 5.5 | 5.5 | 7.0 | 9.0 |
| G4 mm | 8.0 | 8.0 | 8.0 | 8.0 | 8.0 |
| Elongation at break (side) % | 400 | 400 | 400 | 400 | 400 |
| Elastic modulus (side) MPa | 2.0 | 2.0 | 2.0 | 2.0 | 2.0 |
| Elastic modulus (cr) % | 350 | 350 | 350 | 350 | 350 |
| Presence/absence of organic fiber reinforcing layer | Absent | Absent | Absent | Absent | Absent |
| Presence/absence of steel reinforcing layer | Absent | Absent | Absent | Absent | Absent |
| Tire Weight Reduction Amount kg | 1.2 | 1.2 | 1.2 | 1.2 | 1.2 |
| Durability Index | 115 | 117 | 116 | 118 | 119 |

| | Example 23 | Example 24 | Example 25 | Example 26 |
|---|---|---|---|---|
| Presence/absence of recess portion | Present | Present | Present | Present |
| G1 mm | 16 | 16 | 16 | 16 |
| 0.10 × (G1 − 17) | −0.1 | −0.1 | −0.1 | −0.1 |
| 0.05 × (G1 − 10) | 0.3 | 0.3 | 0.3 | 0.3 |
| A/(S + A) | 0.2 | 0.2 | 0.2 | 0.2 |
| Outer outline shape with respect to straight line L4 | Outside | Outside | Outside | Outside |
| S1/S | 0.4 | 0.4 | 0.4 | 0.4 |
| G2/G1 | 0.7 | 0.7 | 0.7 | 0.7 |
| Elongation at break (upper side BF) % | 500 | 500 | 500 | 500 |
| Elastic modulus (upper side BF) MPa | 5.5 | 5.5 | 5.5 | 5.5 |
| Elastic modulus (lower side BF) MPa | 17.0 | 17.0 | 17.0 | 17.0 |
| S3/S2 | 0.50 | 0.50 | 0.50 | 0.50 |
| G3 mm | 14.0 | 9.0 | 9.0 | 9.0 |
| G4 mm | 8.0 | 22.0 | 28.0 | 35.0 |
| Elongation at break (side) % | 400 | 400 | 400 | 400 |
| Elastic modulus (side) MPa | 2.0 | 2.0 | 2.0 | 2.0 |
| Elastic modulus (cr) % | 350 | 350 | 350 | 350 |
| Presence/absence of organic fiber reinforcing layer | Absent | Absent | Absent | Absent |
| Presence/absence of steel reinforcing layer | Absent | Absent | Absent | Absent |
| Tire Weight Reduction Amount kg | 1.2 | 1.2 | 1.2 | 1.2 |
| Durability Index | 118 | 120 | 121 | 120 |

TABLE 4

| | Example 27 | Example 28 | Example 29 | Example 30 |
|---|---|---|---|---|
| Presence/absence of recess portion | Present | Present | Present | Present |
| G1 mm | 16 | 16 | 16 | 16 |
| 0.10 × (G1 − 17) | −0.1 | −0.1 | −0.1 | −0.1 |
| 0.05 × (G1 − 10) | 0.3 | 0.3 | 0.3 | 0.3 |
| A/(S + A) | 0.2 | 0.2 | 0.2 | 0.2 |
| Outer outline shape with respect to straight line L4 | Outside | Outside | Outside | Outside |
| S1/S | 0.4 | 0.4 | 0.4 | 0.4 |
| G2/G1 | 0.7 | 0.7 | 0.7 | 0.7 |
| Elongation at break (upper side BF) % | 500 | 500 | 500 | 500 |
| Elastic modulus (upper side BF) MPa | 5.5 | 5.5 | 5.5 | 5.5 |
| Elastic modulus (lower side BF) MPa | 17.0 | 17.0 | 17.0 | 17.0 |
| S3/S2 | 0.50 | 0.50 | 0.50 | 0.50 |
| G3 mm | 9.0 | 9.0 | 9.0 | 9.0 |

TABLE 4-continued

| | | | | |
|---|---|---|---|---|
| G4 mm | 28.0 | 28.0 | 28.0 | 28.0 |
| Elongation at break (side) % | 550 | 550 | 550 | 550 |
| Elastic modulus (side) MPa | 2.0 | 2.5 | 4.0 | 5.5 |
| Elastic modulus (cr) % | 350 | 350 | 350 | 350 |
| Presence/absence of organic fiber reinforcing layer | Absent | Absent | Absent | Absent |
| Presence/absence of steel reinforcing layer | Absent | Absent | Absent | Absent |
| Tire Weight Reduction Amount kg | 1.2 | 1.2 | 1.2 | 1.2 |
| Durability Index | 123 | 124 | 125 | 124 |

| | Example 31 | Example 32 | Example 33 |
|---|---|---|---|
| Presence/absence of recess portion | Present | Present | Present |
| G1 mm | 16 | 16 | 16 |
| 0.10 × (G1 − 17) | −0.1 | −0.1 | −0.1 |
| 0.05 × (G1 − 10) | 0.3 | 0.3 | 0.3 |
| A/(S + A) | 0.2 | 0.2 | 0.2 |
| Outer outline shape with respect to straight line L4 | Outside | Outside | Outside |
| S1/S | 0.4 | 0.4 | 0.4 |
| G2/G1 | 0.7 | 0.7 | 0.7 |
| Elongation at break (upper side BF) % | 500 | 500 | 500 |
| Elastic modulus (upper side BF) MPa | 5.5 | 5.5 | 5.5 |
| Elastic modulus (lower side BF) MPa | 17.0 | 17.0 | 17.0 |
| S3/S2 | 0.50 | 0.50 | 0.50 |
| G3 mm | 9.0 | 9.0 | 9.0 |
| G4 mm | 28.0 | 28.0 | 28.0 |
| Elongation at break (side) % | 550 | 550 | 550 |
| Elastic modulus (side) MPa | 4.0 | 4.0 | 4.0 |
| Elastic modulus (cr) % | 500 | 500 | 500 |
| Presence/absence of organic fiber reinforcing layer | Absent | Present | Present |
| Presence/absence of steel reinforcing layer | Absent | Absent | Present |
| Tire Weight Reduction Amount kg | 1.2 | 1.2 | 1.2 |
| Durability Index | 125 | 126 | 127 |

As is clear from Tables 1 to 4, in each of Examples 1 to 33, the tire weight was successfully reduced while maintaining favorable durability. Conversely, in Comparative Example 1, the durability was deteriorated although the tire weight was reduced by providing the recess portion.

The invention claimed is:

1. A pneumatic tire comprising:
a tread portion extending in a tire circumferential direction and having an annular shape;
a pair of sidewall portions respectively disposed on both sides of the tread portion;
a pair of bead portions each disposed on an inner side of the sidewall portions in a tire radial direction;
a bead core disposed at each bead portion;
a bead filler disposed on an outer side of the bead core in the tire radial direction; and
at least one carcass layer disposed between the pair of bead portions,
the carcass layer comprising
a body portion turned-up from a tire inner side to a tire outer side around the bead core and the bead filler disposed at each bead portion, and located between the pair of bead portions, and
a turned-up portion turned-up on an outer side of the bead core and the bead filler in a tire width direction,
with a width between the pair of bead portions in a non-rim assembled state being set to a specified rim width,
the pneumatic tire comprising a recess portion that is continuous in the tire circumferential direction in a tire outer surface on an outer side of a turned-up edge of the carcass layer of at least one of the sidewall portions in the tire radial direction and on an inner side of a tire maximum width position in the tire radial direction, the recess portion having an outline comprising a plurality of arcs with different curvature radii in a meridian cross-section,
in the meridian cross-section, an area A (unit: mm$^2$) of a region surrounded by outer outlines of the sidewall portion and the bead portion and a tangent line L1, an area S (unit: mm$^2$) of a region surrounded by the outer outlines of the sidewall portion and the bead portion, the body portion, a perpendicular line L2, and a perpendicular line L3, and a thickness G1 (unit: mm) of the bead filler measured along the perpendicular line L2 satisfying a relationship of $0.10\times(G1-17) \leq A/(S+A) \leq 0.05\times(G1-10)$,
the tangent line L1 being a straight line set in contact with the outer outlines of the sidewall portion and the bead portion, a contact point P1 being a point where the tangent line L1 and the outer outline of the sidewall portion are in contact with each other, the perpendicular line L2 being a straight line that passes through the turned-up edge of the carcass layer and perpendicularly intersects the body portion, the perpendicular line L3 being a straight line that passes through the contact point P1 and perpendicularly intersects the body portion.

2. The pneumatic tire according to claim 1, wherein a ratio G2/G1 of a thickness G2 (unit: mm) of the bead filler measured on a straight line that passes through a contact point P2 and perpendicularly intersects the body portion with respect to the thickness G1 satisfies a relationship of $0.55 \leq G2/G1 \leq 0.90$, and a ratio S1/S of an area S1 (unit: mm$^2$) of a region occupied by the bead filler in the area S with respect to the area S satisfies a relationship of $0.25 \leq S1/$ S≤0.50, the contact point P2 being a point where the tangent line L1 and the outer outline of the bead portion are in contact with each other.

3. The pneumatic tire according to claim 1, wherein
a distance G3 between the turned-up edge and the tire outer surface measured on the perpendicular line L2 is 7.0 mm or more and 14.0 mm or less, and
a distance G4 between an outer surface of the recess portion and the turned-up edge measured on an extension line of the turned-up portion is 10.0 mm or more and 40.0 mm or less.

4. The pneumatic tire according to claim 1, wherein a side rubber of the sidewall portion has an elongation at break of 450% or more, and an elastic modulus at 60° C. of 2.5 MPa or more and 5.5 MPa or less.

5. The pneumatic tire according to claim 1, wherein a crack suppression rubber layer is disposed so as to cover the turned-up edge, and the crack suppression rubber layer has an elongation at break of 400% or more.

6. The pneumatic tire according to claim 1, further comprising an organic fiber reinforcing layer on an outer side of the turned-up portion of the carcass layer in the tire width direction, wherein
an end portion of the organic fiber reinforcing layer on an outer side in the tire radial direction is located on the outer side of the turned-up edge in the tire radial direction,
an end portion of the organic fiber reinforcing layer on an inner side in the tire radial direction is located on the inner side of a center of the bead core in the tire radial direction, and
an end portion of the organic fiber reinforcing layer on the outer side in the tire radial direction is separated from the recess portion by 6 mm or more.

7. The pneumatic tire according to claim 1, further comprising a steel reinforcing layer disposed along outer surfaces of the body portion and the turned-up portion of the carcass layer, wherein
an end portion of the steel reinforcing layer on the turned-up portion side is disposed at a position separated by 5 mm to 25 mm from a position of the turned-up edge on an inner side in the tire radial direction, and
an end portion of the steel reinforcing layer on the body portion side is disposed at a position separated by 5 mm to 25 mm from a position of the turned-up edge on an outer side in the tire radial direction.

8. The pneumatic tire according to claim 1, wherein
the bead filler has a two-layer structure comprising an upper bead filler and a lower bead filler, and
the upper bead filler has an elongation at break of 400% or more.

9. The pneumatic tire according to claim 8, wherein
the upper bead filler has an elastic modulus at 60° C. of 4.0 MPa or more and 8.0 MPa or less, and
the lower bead filler has an elastic modulus at 60° C. of 14.0 MPa or more and 20.0 MPa or less.

10. The pneumatic tire according to claim 8, wherein an area S2 of the upper bead filler and an area S3 of the lower bead filler satisfy a relationship of 0.30≤S3/S2≤0.80.

11. The pneumatic tire according to claim 1, wherein the outer outlines of the sidewall portion and the bead portion located between a contact point P2 and a point P3 are located on an outer side of a straight line L4 in the tire width direction, the contact point P2 being a point where the tangent line L1 and the outer outline of the bead portion are in contact with each other, the point P3 being a point separated by 10 mm from the contact point P2 on an outer side in the tire radial direction along the outer outlines of the sidewall portion and the bead portion, the straight line L4 connecting the contact point P2 and the point P3.

12. The pneumatic tire according to claim 11, wherein a ratio G2/G1 of a thickness G2 (unit: mm) of the bead filler measured on a straight line that passes through a contact point P2 and perpendicularly intersects the body portion with respect to the thickness G1 satisfies a relationship of 0.55≤G2/G1≤0.90, and a ratio S1/S of an area S1 (unit: mm$^2$) of a region occupied by the bead filler in the area S with respect to the area S satisfies a relationship of 0.25≤S1/S≤0.50, the contact point P2 being a point where the tangent line L1 and the outer outline of the bead portion are in contact with each other.

13. The pneumatic tire according to claim 12, wherein
the bead filler has a two-layer structure comprising an upper bead filler and a lower bead filler, and
the upper bead filler has an elongation at break of 400% or more.

14. The pneumatic tire according to claim 13, wherein
the upper bead filler has an elastic modulus at 60° C. of 4.0 MPa or more and 8.0 MPa or less, and
the lower bead filler has an elastic modulus at 60° C. of 14.0 MPa or more and 20.0 MPa or less.

15. The pneumatic tire according to claim 14, wherein an area S2 of the upper bead filler and an area S3 of the lower bead filler satisfy a relationship of 0.30≤S3/S2≤0.80.

16. The pneumatic tire according to claim 15, wherein
a distance G3 between the turned-up edge and the tire outer surface measured on the perpendicular line L2 is 7.0 mm or more and 14.0 mm or less, and
a distance G4 between an outer surface of the recess portion and the turned-up edge measured on an extension line of the turned-up portion is 10.0 mm or more and 40.0 mm or less.

17. The pneumatic tire according to claim 16, wherein a side rubber of the sidewall portion has an elongation at break of 450% or more, and an elastic modulus at 60° C. of 2.5 MPa or more and 5.5 MPa or less.

18. The pneumatic tire according to claim 17, wherein a crack suppression rubber layer is disposed so as to cover the turned-up edge, and the crack suppression rubber layer has an elongation at break of 400% or more.

19. The pneumatic tire according to claim 18, further comprising an organic fiber reinforcing layer on an outer side of the turned-up portion of the carcass layer in the tire width direction, wherein
an end portion of the organic fiber reinforcing layer on an outer side in the tire radial direction is located on the outer side of the turned-up edge in the tire radial direction,
an end portion of the organic fiber reinforcing layer on an inner side in the tire radial direction is located on the inner side of a center of the bead core in the tire radial direction, and
an end portion of the organic fiber reinforcing layer on the outer side in the tire radial direction is separated from the recess portion by 6 mm or more.

20. The pneumatic tire according to claim 19, further comprising a steel reinforcing layer disposed along outer surfaces of the body portion and the turned-up portion of the carcass layer, wherein
an end portion of the steel reinforcing layer on the turned-up portion side is disposed at a position separated by 5 mm to 25 mm from a position of the turned-up edge on an inner side in the tire radial direction, and an end portion of the steel reinforcing layer on the body portion side is disposed at a position separated by 5 mm to 25 mm from a position of the turned-up edge on an outer side in the tire radial direction.

* * * * *